(12) United States Patent
Kumaresan et al.

(10) Patent No.: US 7,831,642 B1
(45) Date of Patent: Nov. 9, 2010

(54) PAGE CACHE MANAGEMENT FOR A SHARED FILE

(75) Inventors: Balemurughan Kumaresan, Palo Alto, CA (US); Harold Bailey Prince, Jr., Palo Alto, CA (US); Ramesh Balan, Cupertino, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1028 days.

(21) Appl. No.: 10/961,454

(22) Filed: Oct. 8, 2004

Related U.S. Application Data

(63) Continuation of application No. 10/955,072, filed on Sep. 30, 2004, now abandoned.

(51) Int. Cl.
G06F 12/00 (2006.01)
G06F 13/00 (2006.01)

(52) U.S. Cl. ........................ 707/822; 711/163
(58) Field of Classification Search ............ None
See application file for complete search history.

(56) References Cited

U.S. PATENT DOCUMENTS

| | | | | |
|---|---|---|---|---|
| 4,758,951 A * | 7/1988 | Sznyter, III | ............... | 711/206 |
| 5,410,697 A * | 4/1995 | Baird et al. | ............... | 711/152 |
| 5,452,447 A * | 9/1995 | Nelson et al. | ............... | 707/205 |
| 5,561,799 A * | 10/1996 | Khalidi et al. | ............... | 707/200 |
| 5,729,710 A * | 3/1998 | Magee et al. | ............... | 711/203 |
| 5,751,981 A * | 5/1998 | Witt et al. | ............... | 712/204 |
| 5,867,683 A * | 2/1999 | Witt et al. | ............... | 712/218 |
| 5,909,540 A * | 6/1999 | Carter et al. | ............... | 714/4 |
| 5,987,506 A * | 11/1999 | Carter et al. | ............... | 709/213 |
| 6,026,474 A * | 2/2000 | Carter et al. | ............... | 711/202 |
| 6,108,759 A * | 8/2000 | Orcutt et al. | ............... | 711/173 |
| 6,112,286 A * | 8/2000 | Schimmel et al. | ............... | 711/208 |
| 6,523,102 B1 * | 2/2003 | Dye et al. | ............... | 711/170 |
| 6,658,462 B1 * | 12/2003 | Dutta | ............... | 709/219 |
| 7,010,693 B1 * | 3/2006 | Lee et al. | ............... | 713/176 |
| 7,017,013 B2 * | 3/2006 | Percival | ............... | 711/141 |
| 7,039,767 B2 * | 5/2006 | Percival | ............... | 711/141 |
| 7,143,288 B2 * | 11/2006 | Pham et al. | ............... | 713/165 |
| 7,233,946 B1 * | 6/2007 | McPolin | ............... | 707/8 |
| 7,237,061 B1 * | 6/2007 | Boic | ............... | 711/113 |
| 7,383,389 B1 * | 6/2008 | Bumbulis | ............... | 711/130 |
| 2002/0059309 A1 * | 5/2002 | Loy et al. | ............... | 707/200 |
| 2002/0083120 A1 * | 6/2002 | Soltis | ............... | 709/200 |
| 2003/0028695 A1 * | 2/2003 | Burns et al. | ............... | 710/200 |
| 2003/0046260 A1 * | 3/2003 | Satyanarayanan et al. | ............... | 707/1 |
| 2003/0195862 A1 * | 10/2003 | Harrell, Jr. | ............... | 707/1 |
| 2003/0200193 A1 * | 10/2003 | Boucher | ............... | 707/1 |

(Continued)

OTHER PUBLICATIONS

"The Design and Implementation of a Locking Mechanism for a Distributed Computing Environment", Sep. 23, 2004.*

Primary Examiner—Neveen Abel Jalil
Assistant Examiner—Tarek Chbouki
(74) Attorney, Agent, or Firm—Campbell Stephenson LLP

(57) ABSTRACT

A method, system, computer system, and computer-readable medium to efficiently coordinate caching operations between nodes operating on the same file while allowing different regions of the file to be written concurrently. More than one program can concurrently read and write to the same file. Pages of data from the file are proactively and selectively cached and flushed on different nodes. In one embodiment, range locks are used to effectively flush and invalidate only those pages that are accessed on another node.

23 Claims, 6 Drawing Sheets

Lock Mechanics

U.S. PATENT DOCUMENTS

| | | | |
|---|---|---|---|
| 2003/0217080 A1* | 11/2003 | White et al. | 707/200 |
| 2004/0221125 A1* | 11/2004 | Ananthanarayanan et al. | 711/203 |
| 2005/0268067 A1* | 12/2005 | Lee et al. | 711/202 |
| 2005/0273570 A1* | 12/2005 | DeSouter et al. | 711/203 |
| 2006/0005189 A1* | 1/2006 | Vega et al. | 718/1 |
| 2006/0047958 A1* | 3/2006 | Morais | 713/166 |
| 2008/0222223 A1* | 9/2008 | Srinivasan et al. | 707/205 |

* cited by examiner

Sequential Execution Of Write Operations On A File

Simultaneous Execution Of Write Operations On A File

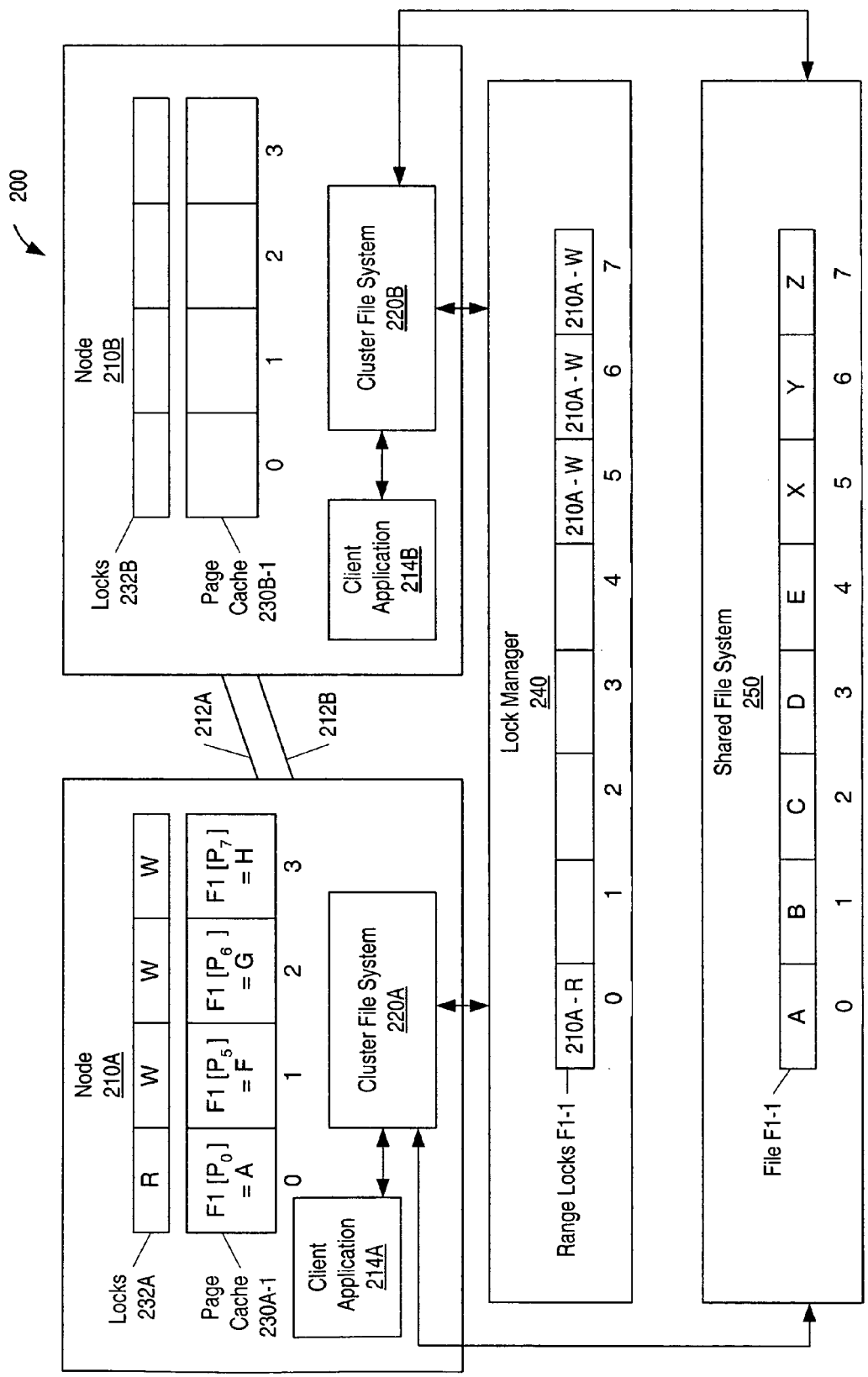
FIG. 2 Environment

| # | Action | File1 | | | | | | | | Node X Page Cache | | | | Node Y Page Cache | | | | Range Locks | | | | | | | |
|---|---|---|---|---|---|---|---|---|---|---|---|---|---|---|---|---|---|---|---|---|---|---|---|---|---|
| | | 0 | 1 | 2 | 3 | 4 | 5 | 6 | 7 | 0 | 1 | 2 | 3 | 0 | 1 | 2 | 3 | 0 | 1 | 2 | 3 | 4 | 5 | 6 | 7 |
| 1. | Initial Values | A | B | C | D | E | X | Y | Z | | | | | | | | | | | | | | | | |
| 2. | Grant range lock to read $P_0$ to node X | A | B | C | D | E | X | Y | Z | | | | | | | | | X - read | | | | | | | |
| 3. | Node X reads $P_0$ | A | B | C | D | E | X | Y | Z | A | | | | | | | | X - read | | | | | | | |
| 4. | Grant range lock to write $P_5$, $P_6$, $P_7$ to node X | A | B | C | D | E | X | Y | Z | A | | | | | | | | X - read | | | | | X - write | X - write | X - write |
| 5. | Node X caches new values for $P_5$, $P_6$, $P_7$ | A | B | C | D | E | X | Y | Z | A | F | G | H | | | | | X - read | | | | | X - write | X - write | X - write |
| 6. | Grant range lock to read $P_0$ to node Y | A | B | C | D | E | X | Y | Z | A | F | G | H | | | | | X&Y read | | | | | X - write | X - write | X - write |
| 7. | Node Y reads $P_0$ | A | B | C | D | E | X | Y | Z | A | F | G | H | A | | | | X&Y read | | | | | X - write | X - write | X - write |
| 8. | Node Y requests to write $P_5$ | A | B | C | D | E | X | Y | Z | A | F | G | H | A | | | | X&Y read | | | | | X - write | X - write | X - write |
| 9. | Revoke range lock for $P_5$ from Node X | A | B | C | D | E | X | Y | Z | A | | G | H | A | | | | X&Y read | | | | | | X - write | X - write |
| 10. | Write new value of $P_5$ to disk and invalidate in Node X page cache | A | B | C | D | E | F | Y | Z | A | | G | H | A | | | | X&Y read | | | | | | X - write | X - write |
| 11. | Grant range lock for $P_5$ to Node Y | A | B | C | D | E | F | Y | Z | A | | G | H | A | | | | X&Y read | | | | | Y - write | X - write | X - write |
| 12. | Node Y caches new value of M for $P_5$ | A | B | C | D | E | F | Y | Z | A | | G | H | A | M | | | X&Y read | | | | | Y - write | X - write | X - write |
| 13. | Write new value of $P_5$ to disk and invalidate in Node Y page cache | A | B | C | D | E | M | Y | Z | A | | G | H | A | | | | X&Y read | | | | | Y - write | X - write | X - write |

*FIG. 3*

| | Action | File1 | | | | | | | | Node X Page Cache | | | | Node Y Page Cache | | | | Range Locks | | | | | | | |
|---|---|---|---|---|---|---|---|---|---|---|---|---|---|---|---|---|---|---|---|---|---|---|---|---|---|
| | | 0 | 1 | 2 | 3 | 4 | 5 | 6 | 7 | 0 | 1 | 2 | 3 | 0 | 1 | 2 | 3 | 0 | 1 | 2 | 3 | 4 | 5 | 6 | 7 |
| 1. | Initial Values | A | B | C | D | E | M | Y | N | A | | G | H | A | | | | X&Y read | | | | | Y - write | X - write | X - write |
| 2. | Node Y requests to write P₀ | A | B | C | D | E | M | Y | N | A | | G | H | A | | | | X&Y read | | | | | Y - write | X - write | X - write |
| 3. | Revoke range lock for P₀ from Node X | A | B | C | D | E | M | Y | N | A | | G | H | A | | | | Y - read | | | | | Y - write | X - write | X - write |
| 4. | Discard value for P₀ in Node X page cache (no need to write value to disk) | A | B | C | D | E | M | Y | N | | | G | H | A | | | | Y - read | | | | | Y - write | X - write | X - write |
| 5. | Grant range lock for P₀ to Node Y | A | B | C | D | E | M | Y | N | | | G | H | A | | | | Y - write | | | | | Y - write | X - write | X - write |
| 6. | Node Y caches new value of K for P₀ | A | B | C | D | E | M | Y | N | | | G | H | K | | | | Y - write | | | | | Y - write | X - write | X - write |
| 7. | Write new value of P₀ to disk and invalidate in Node Y page cache | K | B | C | D | E | M | Y | N | | | G | H | | | | | Y - write | | | | | Y - write | X - write | X - write |

FIG. 4
*Overwrite Data After Reading*

Lock Mechanics

PAGE CACHE MANAGEMENT FOR A SHARED FILE

CROSS-REFERENCE TO RELATED APPLICATIONS

The present patent application is a continuation of U.S. patent application Ser. No. 10/955,072, filed on Sep. 30, 2004 now abandoned, entitled "Concurrent Input/Output To A File Using File System-Independent I/O Commands" incorporated by reference herein in its entirety and for all purposes.

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

Most complex business applications are run not on a single computer system, but in a distributed system in which multiple computer systems, referred to as nodes, each contribute processing resources and perform different tasks. Some types of distributed applications involve sharing a single file among one or more nodes, where more than one node can update the shared file. Examples of such distributed applications include seismic data processing, imaging, scientific computation, and so on.

When a file is shared, more than one program may wish to read and/or write data to the shared file at the same point in time. Concurrent read operations are commonly supported by most applications and file systems, but concurrent write operations require more sophisticated management techniques and are less commonly supported. For example, assume that one writer program writes AA to a given location in a file, and another writer program writes BB to the same location in the file at the same time. After both write commands are completed, a reader program should read either AA or BB, and not AB, from that location in the file, depending upon the order in which the write operations complete. This functionality follows the Portable Operating System Interface (POSIX) standard, which defines the language interface between application programs and the Unix operating system. Adherence to the POSIX standard ensures compatibility when programs are moved from one Unix computer to another, a highly desirable feature. For example, the standard "read" and "write" I/O commands are expected to operate as described above when performed by any application program on any operating system.

To assure POSIX compliance, most file systems require that only one program can write to the file at one time, and no programs can read the file while data are being written to the file. However, compliance with these requirements requires serializing write commands and delaying read commands, thereby degrading performance significantly, particularly with very large shared files.

FIG. 1A shows sequential execution of write operations on a file. Input/output commands are being executed on file 102 by processes 110A, 110B, 110C, and 110D. File 102 is shown as including eight portions (labeled 0 through 7). While a single character is shown to represent the data contained in each portion of file 102, one of skill in the art will understand that the data are for illustration purposes and represent portions of the file containing one or more bytes. One of skill in the art will also understand that the term "portion" is used in a general sense to indicate the units in which file 102 is read, whereas files are often described as being read as blocks or regions of data, where multiple blocks occur within a given region. No particular unit of measure is intended by use of the term "portion" herein.

In FIG. 1A, process 110A writes data to portion 1 (P1) of file 102, and process 110B writes data to portions 5 and 6 (P5 and P6). Process 110C reads data from portions 4 through 7 of file 102, and process 110D extends the size of file 102 to ten portions. Processes 110B and 110C can be said to request "conflicting operations," because the portions targeted by the operations overlap and at least one of the operations is a write operation. The requirement that one of the operations is a write operation takes into account that multiple simultaneous read operations are allowed by most file systems, even if the portions targeted by each read operation overlap.

In a typical prior art file system, using standard "read" and "write" commands, only one of processes 110A, 110B, and 110D can write to file 102 at one time. Furthermore, process 110C cannot read from file 102 while any of processes 110A, 110B, and 110D is writing data to file 102. Also, using standard file system interfaces, no I/O commands can be executed during an operation that changes the size of a file or allocates new space to a file. As a result, each of processes 110A, 110B, and 110D is executed sequentially; in the example shown, process 110A executes first at time $t_1$ and process 110B writes data to file 102 second at time $t_2$. Finally, process 110D extends the size of file 102 at time $t_3$. One of skill in the art will recognize that a different sequential ordering may be followed, depending upon the order in which processes 110A, 110B, and 110D initiate the respective operations. Process 110C can read from file 102 only at a point in time when none of processes 110A, 110B, and 110D is writing to file 102.

Several attempts to enable concurrent input and output to a file have been made. Some file systems provide specific application program interfaces (APIs) that allow concurrent programs to perform I/O operations on a single file. These file systems typically rely upon application programs to use these file system-specific interfaces to synchronize conflicting input/output commands so that a consistent view of the file is seen by multiple readers and writers. Rather than use standard file system-independent, POSIX-compliant I/O commands, special commands or interfaces are used to perform I/O to files, thereby requiring application programs to be changed for different file systems.

For example, Veritas Software Corporation's File System (VxFS) provides commands and interfaces including qio ("quick I/O") and Oracle Corporation provides Oracle Disk Manager for Oracle database files. Specific APIs include a special file system-specific open flag for opening a file for concurrent I/O and a special file system-specific mount option to mount the file system to enable concurrent I/O. However, these options cannot be used for all I/O operations on all types of files. Depending upon the specific interface used, some APIs can be used only for direct I/O or within a special namespace. Other APIs require applications to perform locking. In some file systems, if an application does not properly synchronize I/O commands, inconsistent data may be produced with overlapping write commands (such as the AB result described in the scenario above).

In some Unix file systems, a "range locking" facility is provided to enable file and record locking. This facility can be used by cooperating concurrent processes to access regions in a file in a consistent fashion. A file region can be locked for shared or exclusive access, and the lock serves as a mechanism to prevent more than one process from writing to the same file region at once. However, this type of range locking controls cooperation between processes with regard to writing data to the same region of a file, but does not affect whether I/O operations can execute concurrently on different regions of the same file. The file system itself serializes I/O operations on different regions of the same file.

When more than one node performs I/O operations to the same file, each node may operate with its own cache rather than writing directly to the file itself. In some clustered environments, the portions of a file that have been written by each node are tracked in a table or bitmap at each respective node. A write operation produces a "dirty page" in the cache on the node performing the write operation. Dirty pages may be tracked by setting a bit in a bitmap. When another node requests to perform I/O operations on a portion of a file that has been written by another node (corresponding to the dirty pages in the cache), the node holding a lock for the file "flushes" the updated value from cache to disk before relinquishing the lock. In some implementations, the cached value for the portion of the file just written is also invalidated. In other implementations, a bit may be set indicating that the value in that portion of the cache is no longer dirty, indicating that the value in that location of the cache can be overwritten.

In prior art systems, using one lock for the entire file required that the entire cache for all dirty pages be written to disk. If node A has dirty pages corresponding to the data in the first half of the file and another node B reads from the second half of the file, the dirty pages on node A will be unnecessarily flushed to disk since B will not be reading that data. Similarly, if node A has dirty pages corresponding to the first half of the file and another node B writes to the second half of the file, the dirty pages on node A will be written to disk and the page cache on node A invalidated before those operations are needed. Furthermore, any bitmap corresponding to regions changed in the file will be invalidated.

What is needed is a way to efficiently coordinate caching operations between nodes operating on the same file while allowing different regions of the file to be written concurrently.

SUMMARY OF THE INVENTION

The present invention provides a method, system, computer system, and computer-readable medium to efficiently coordinate caching operations between nodes operating on the same file while allowing different regions of the file to be written concurrently. More than one program can concurrently read and write to the same file. Pages of data from the file are proactively and selectively cached and flushed on different nodes. In one embodiment, range locks are used to effectively flush and invalidate only those pages that are accessed on another node.

In response to a request for access to a first portion of a file by a first node when a second node has been granted access to the first portion of the file, an operation is performed on a set of pages in a page cache for the second node. The set of pages corresponds to the first portion of the file. The operation is performed selectively, so that if a second set of pages in the page cache corresponds to a second portion of the file, and the first portion of the file does not comprise the second portion of the file, the operation is not performed on the second set of pages.

If the second node has exclusive access to the first portion, the set of pages can be flushed from the page cache to the file. If the second node has shared access to the first portion, the set of pages can be invalidated in the page cache. The method may further include causing the first node to read the first portion from the file and/or causing the first portion to be provided to the first node.

BRIEF DESCRIPTION OF THE DRAWINGS

The present invention may be better understood, and its numerous features and advantages made apparent to those skilled in the art by referencing the accompanying drawings.

FIG. 2 provides an example of one embodiment of a system that can be used to implement the present invention.

FIG. 3 shows an example of a scenario using range locks when different nodes write to portions of the same file.

FIG. 4 shows another example of a scenario using range locks when different nodes write to portions of the same file.

The use of the same reference symbols in different drawings indicates similar or identical items.

DETAILED DESCRIPTION

The present invention provides a method, system, computer system, and computer-readable medium to allow more than one program to concurrently read and write to the same file using file system-independent interfaces. File system-independent I/O commands can be used by application programs, and file system-specific interfaces are not required. Application programs and/or system configurations do not change when running under different file systems and/or operating systems.

Figure 1A:
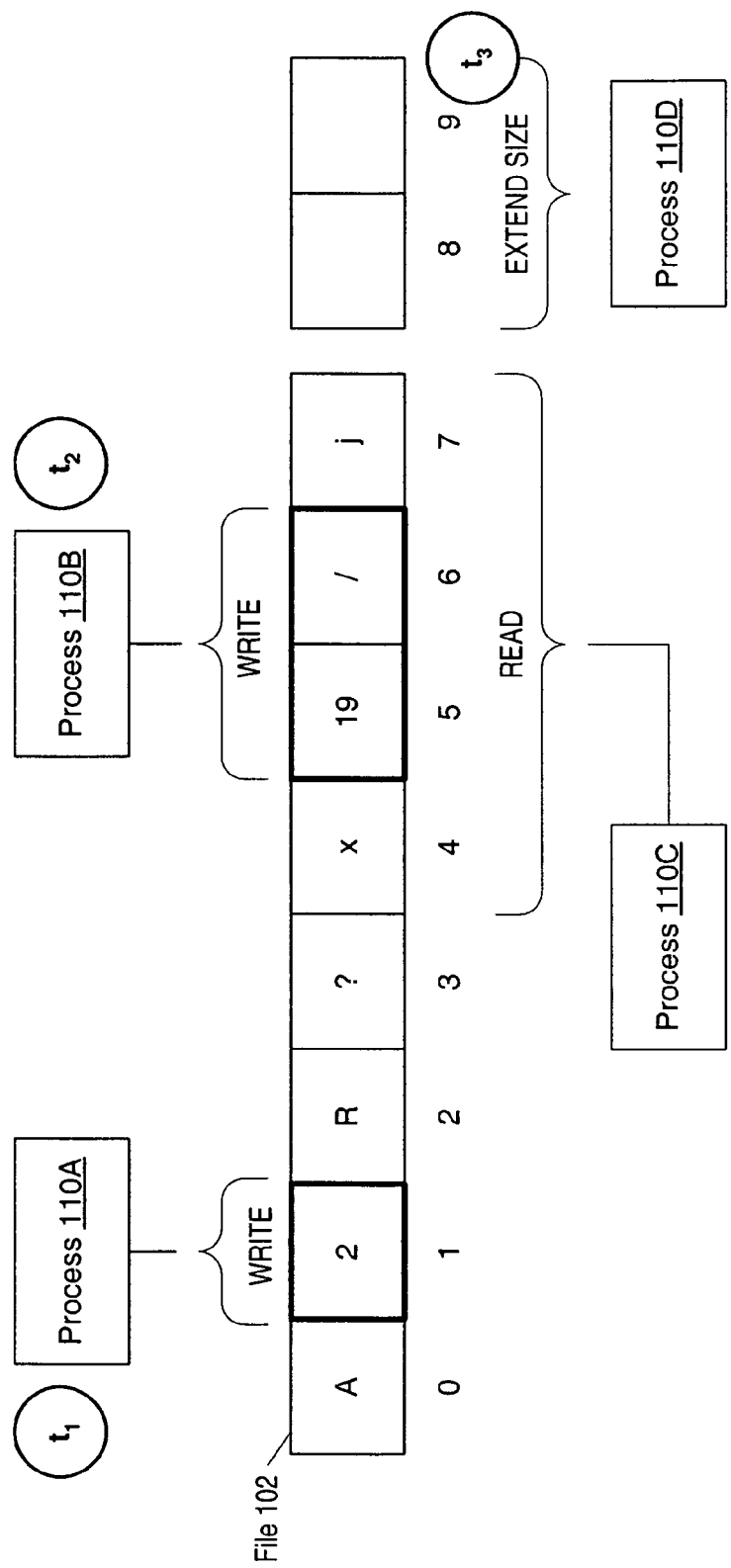
FIG. 1A shows sequential execution of write operations on a file, as described above.
Figure 1B:
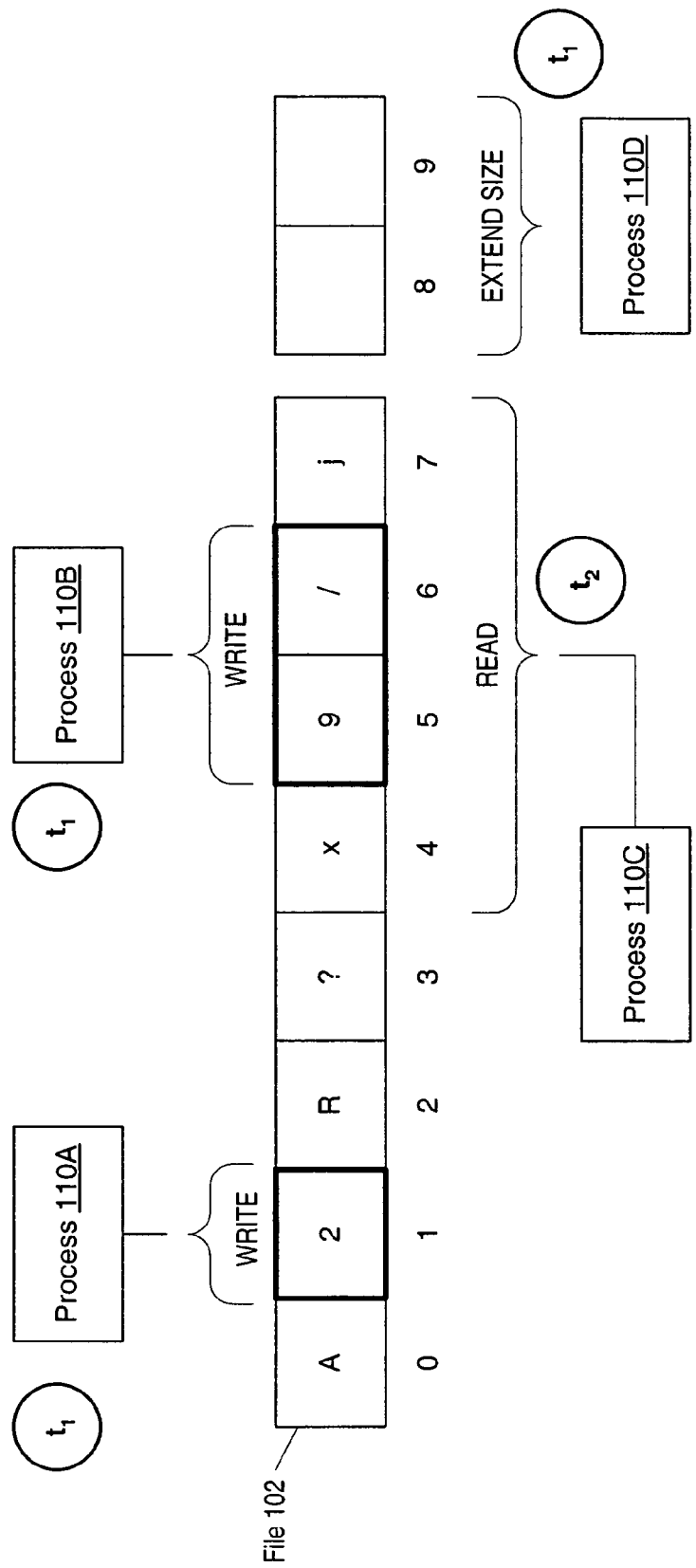
FIG. 1B shows simultaneous execution of the write operations of FIG. 1A on a file.

FIG. 1B shows simultaneous execution of the write operations of FIG. 1A on a file in accordance with one embodiment of the invention. Because no two processes of 110A, 110B, and 110D are operating on the same region of the file, processes 110A, 110B, and 110D can be executed simultaneously. All of processes 110A, 110B, and 110D are shown as executing at time $t_1$. Even though process 110D is extending the size of the file, read and/or write operations can be performed by processes 110A and 110B on the "old" portion of the file simultaneously.

Process 110C reads portions 4-7 at time $t_2$, after process 110B completes the write operation. Alternatively, process 110C could read portions 4-7 prior to the write operation performed by process 110B to portions 5 and 6. Because processes 110A and 110D affect portions that are not read by process 110C, the present invention enables process 110C to read file 102 simultaneously with the performance of write operations by processes 110A and/or 110D.

Coordination between programs accessing shared data is often implemented using locks. Typically, a lock protects a piece of shared data; for example, in a file system, a lock can protect a file. In a distributed system, a lock can also protect shared "state" information distributed in memories of each node in the system, such as the online or offline status of a given software application. Shared data is protected by a lock, and locks are typically managed by a lock manager, which often provides an interface to be used by other application programs.

A lock is requested before the calling application program can access data protected by the lock. A calling application program can typically request an "exclusive" lock to write or update data protected by the lock or a "shared" lock to read data protected by the lock. If the calling application program is granted an exclusive lock, then the lock manager guarantees that the calling program is the only program holding the lock. If the calling program is granted a shared lock, then other programs may also be holding shared locks on the data, but no other program can hold an exclusive lock on that data.

The lock manager cannot always grant a lock request right away. Consider an example where one program has an exclusive lock on a given file, and a second program requests shared access to that file. The second program's request cannot be granted until the first program has released the exclusive lock on the file. As a result, no more than one program can write to a given file at one time, and concurrent input/output to the file is not possible.

In most typical file systems, a single lock protects access to a given file. As a result, any two read/write or write/write requests to the file are serialized, even though they may be to non-overlapping portions of the same file. In a clustered environment, each node may maintain a bit map (or other such data) to track the changes made to a shared file. The range locks proposed herein enable concurrent I/O operations to non-overlapping portions of the same file.

FIG. 2 provides an example of one embodiment of a system that can be used to implement the present invention. While this environment shows a cluster made up of two nodes, one of skill in the art will recognize that more than two nodes may be included in the cluster. Furthermore, the invention can also be used in a non-clustered multi-node environment or on a single node.

Cluster 200 includes nodes 210A and 210B, which are interconnected via redundant cluster connections 212A and 212B. Client application 214A runs on node 210A and client application 214B runs on node 210B. Client applications 214A and 214B perform I/O operations to a shared file, file F1-1. To perform an I/O operation on file F1-1, client applications 214A and 214B call respective cluster file systems 220A and 220B. Cluster file systems 220A and 220B communicate with file F1-1 via lock manager 240 to obtain locks on portions of file F1-1, which are discussed in further detail below. In the discussions herein, cluster file systems 220A and 220B are described as interacting directly with the medium storing a file. One of skill in the art will understand that cluster file systems 220A and 220B use the I/O subsystems of the underlying operating systems (not shown) running on the host (not shown) for performing I/O to file F1-1.

Cluster file systems 220A and 220B communicate with shared file system 250. Shared file system 250 is an image of the file system data on shared media storing file F1-1.

Data can be stored by cluster file systems 220A and 220B in respective page caches 230A-1 and 230B-1. One of skill in the art will recognize that, while page caches are shown in FIG. 2, other types of caches may be used to temporarily store data by cluster file systems 220A and 220B before writing the data to disk. Cluster file systems 220A and 220B can be considered to operate as a causing module, means, and/or instructions to cause an operation to be performed on a set of pages in a page cache. Such operations include writing data into the page cache, reading data from the page cache, invalidating an entry in the page cache, and flushing data from the page cache to disk.

Each of page caches 230A-1 and 230B-1 is shown as including four pages, pages 0 through 3. For simplicity, each page in page caches 230A-1 and 230B-1 is shown as having the same size as one portion of file F1-1, although one of skill in the art will recognize that page caches and file portions may be of different sizes. Locks 232A and 232B, respectively, show the access level held by nodes 210A and 210B with regard to the pages currently loaded into page caches 230A-1 and 230B-1. For data to be loaded into one of page caches 230A-1 or 230B-1, the respective node 210A or 210B must have at least shared access to the file.

In the example shown, file F1-1 has eight portions of data, with representative values, respectively, of A, B, C, D, E, X, Y, and Z. Page cache 230A-1 on node 210A contains four pages of data, into which data from four portions of file F1-1 have been loaded. Node 210A has read access to the data in page cache 230A-1 page 0. Node 210A has write access to the data in page cache 230A-1 pages 1 through 3. Location 0 of page cache 230A-1 includes data from file F1 portion 0, shown as F1[$P_0$], having a value of A. Location 1 includes data from file F1 portion 5, shown as F1[$P_5$], having a value of F; location 2 includes data from file F1 portion 6, shown as F1[$P_6$], having a value of G; and location 3 includes data from F1 portion 7, shown as F1[$P_7$], having a value of H. Each of the values in page cache 230A-1 locations 1 through 3 has not yet been written to disk.

A lock manager, such as lock manager 240 of FIG. 2, tracks the locks that are currently in use within cluster 200. In one embodiment, these locks are referred to as "range locks," which are locks that operate on "ranges" of locations in a file. A range directly maps to one or more portions of a file, where offset and (offset+length) are offsets in a file, representing the beginning and end of a portion of a file. By locking only portions of a file, a range lock supports concurrent I/O operations to different portions of a file. Two range lock requests are said to be conflicting if at least one of the requests is for exclusive access to a given range, and the requested lock ranges overlap.

A range and its corresponding range lock are represented herein using an [offset, offset+length] notation. In the example shown in FIG. 2, a range lock is held by node 210A for reading (indicated by -R) F1 portion 0, as shown by the value of 210A-R in the range locks F1-1 data structure. A node, such as one of nodes 210A and 210B, may be described as having "cached a grant" when the node obtains a lock; in this example, node 210A has cached a grant for reading file F1 portion 0. Range locks for writing are also held by node 210A for file F1 portions 5, 6, and 7, as shown by values of 210A-W in the range locks F1-1 data structure. Node 210A can be described as having "cached grants" for writing file F1 portions 5, 6, and 7. In one embodiment, a node may retain a range lock until another node requests that range lock. "Caching" the "grant of the range lock" enables the node to read or write to the same portion of the file protected by the lock multiple times without having to request the lock each time. One of skill in the art will recognize that range locks can be represented in a variety of ways, and that the examples given are illustrations of one of many possible embodiments. In FIG. 2, no values have been read into page cache 230B-1 of node 210B, and node 210B holds no locks, as shown by locks 232B.

In some implementations, the I/O operations themselves may not conflict, but the respective range lock requests may conflict. For example, in such an implementation, two I/O requests to different portions of the same page may result in range lock requests for the same page in the page cache. Such a situation can occur if the page size for the cache is different than the block or region size for a file. If at least one of the I/O requests writes data corresponding to the same page, these I/O requests must be performed serially to maintain POSIX-compliance.

FIGS. 3 and 4 illustrate the coordination between two nodes when both nodes are performing I/O operations to the same file, and each node operates with its own cache rather than writing directly to the file itself. In the following description, the phrases "writing data to the file" and "writing the data to disk" are used to describe the same operation, in contrast to writing data to the cache. In some clustered environments, the portions of a file that have been written by each node are tracked in a table or bitmap at each respective node. A write operation produces a "dirty page" in the cache on the node performing the write operation. Dirty pages may be tracked by setting a bit in a bitmap. When another node requests to perform I/O operations on a portion of a file that has been written by another node (corresponding to the dirty pages in the cache), the node holding a lock for the file "flushes" the updated value from cache to disk before relinquishing the lock. In some implementations, the cached value for the portion of the file just written is also invalidated. In other implementations, a bit may be set indicating that the value in that portion of the cache is no longer dirty, indicating that the value in that location of the cache can be overwritten.

In prior art systems, using one lock for the entire file required that the entire cache for all dirty pages be written to disk. If node A has dirty pages corresponding to the data in the first half of the file and another node B reads from the second half of the file, the dirty pages on node A will be unnecessarily flushed to disk since B will not be reading that data. Similarly, if node A has dirty pages corresponding to the first half of the file and another node B writes to the second half of the file, the dirty pages on node A will be written to disk and the page cache on node A invalidated before those operations are needed. Furthermore, any bitmap corresponding to regions changed in the file will be invalidated. The following examples illustrate that, by performing selective, proactive flushing and invalidation, such premature operations can be prevented.

FIG. 3 shows an example of a scenario using range locks when different nodes write to portions of the same file. Actions and data are shown over time for a file named File1 having portions 0 through 7; for page caches for two nodes, node X and node Y; and for range locks held for portions 0 through 7 of File1. At time 1, as shown by action 1, the initial values of File1 are, respectively, A, B, C, D, E, X, Y, and Z. In action 2, a range lock is granted to node X to read portion 0 of File1, as shown in the range locks column for portion 0. The range locks can be granted by a lock manager, such as lock manager 240 of FIG. 2. A lock manager can be considered to be a granting module, means, and/or instructions for granting access to a portion of a file. Returning to FIG. 3, in action 3, node X reads the value of the data from portion 0 of File1, loading a value of A into node X's page cache location 0. In action 4, range locks are granted to node X to write values to portions 5, 6, and 7 of File1. These grants are reflected in the range locks columns for portions 5, 6, and 7. In action 5, node X writes new values F, G, and H for portions 5, 6, and 7 into node X page cache locations 1, 2, and 3.

In action 6, a range lock to read portion 0 of File1 is granted to node Y, and the range lock column for portion 0 is updated to show that both nodes X and Y have read access to portion 0. In action 7, node Y reads portion 0 of File1, loading a value of A into node Y page cache portion 0. In action 8, node Y requests to write portion 5. Currently, the range lock on portion 5 is held for write access by node X, as shown in the range locks column for portion 5. In action 9, the range lock for portion 5 is revoked from node X, as shown by the blank value in the range lock column for portion 5.

Node X still has a value of F for portion 5 in the node X page cache location 1. As a result, in action 10, the new value of F for portion 5 is written to disk, as shown in the portion 5 column for File1. In addition, the value of F in node X's page cache location 1 for portion 5 is deleted. Only the page in cache corresponding to the affected portion of the file (portion 5) is flushed. Without range locks, the cached values for all pages in cache (corresponding to portions 0, 5, 6, and 7) would have been flushed, resulting in several additional write operations to disk.

In action 11, having revoked the range lock from node X and flushed the updated value of F to disk, the range lock for portion 5 of File1 can be granted to node Y. The range locks column for portion 5 now shows a value of Y-write, indicating that node Y now has write access. In action 12, node Y caches a new value of M in node Y's page cache location 1 to be written to File1 portion 5. In action 13, the new value of M for portion 5 is written to disk, as shown in File1 portion 5. The value of M in node Y page cache location 1 is also invalidated, leaving a blank value in node Y page cache location 1.

Referring back to FIG. 3 action 3, node X reads the value of the data in File1 portion 0. Subsequently, in action 6, node Y obtains a lock to read portion 0. In an alternative scenario (not shown in FIG. 3), assume that node X had overwritten the value of the data in File1 portion 0 in node X's page cache position 0, but had not yet written the new value to File1. In this alternative scenario, node Y would need to obtain the correct value of File1 portion 0. An additional action similar to that of action 10 would have been necessary to write the new value to disk, and an additional action of reading the new value from disk by node Y would have been necessary for node Y to obtain the correct value. Alternatively, node X could have passed the current value of portion 0 to node Y when the lock was granted to node Y, either via a locking message or another network message, so that node Y would not have to read the current value from disk.

Referring back to FIG. 3 action 8, node Y requested to write data to portion 5 of File1. Subsequently, in action 13, node Y wrote a new value for portion 5 to disk in action 13. This example assumed that node Y did not need to read the current value of File1 portion (which node X changed from X to F) and overwrote all data for portion 5. Instead, if node Y needed to obtain the current value of the data in portion 5 before writing a new value, node Y could have read the data from File1 directly from disk. Alternatively, node X could have passed the current value of portion 5 to node Y when the lock was relinquished, either via a locking message or another network message, so that node Y would not have to read the current value from disk.

FIG. 4 shows another example of a scenario using range locks when different nodes write to portions of the same file. As in FIG. 3, actions and data are shown over time for a file named File1 having portions 0 through 7; for page caches for two nodes, node X and node Y; and for range locks held for portions 0 through 7 of File1. At time 1, as shown by action 1, the initial values of File1 are, respectively, A, B, C, D, E, M, X, and Y. Node X page cache locations 0, 2, and 3 have respective values A, G, and H, and node Y page cache location 0 has a value of A. Range locks are held for reading portion 0 of File 1 by both nodes X and Y. Range locks for writing are held for portion 5 by node Y, and for portions 6 and 7 by node X.

In action 2, node Y requests to write a new value to File1 portion 0. No data changes as an immediate result of this request because the lock for File1 portion 0 cannot be immediately granted. In action 3, the range lock for reading is revoked from node X for portion 0, as shown in the range lock column for portion 0, now showing only read access for node Y. Because node X had only read access to File1 portion 0, the value in node X's page cache location 0 can be discarded, as shown in action 4. Node X only discards the page corresponding to portion 0 and does not need to discard the data in portions 6 and 7 (corresponding to page cache locations 2 and 3). In action 5, a range lock for writing is granted to node Y for File1 portion 0, as shown by the value of Y-write in range locks for portion 0. In action 6, node Y caches a new value of K for File1 portion 0, as shown by the value of K in node Y's page cache location 0. In action 7, the new value of K is written to File1 portion 0, and the value of node Y's page cache location 0 is set to blank.

As noted above with respect to FIG. 1B, in one embodiment of the invention, a write operation extending the size of a file can be executed concurrently with other I/O operations. In some implementations, extending the size of a file requires allocating new storage space to the file. One of the advantages offered by the present invention is that this new storage space can be allocated to the file while other processes can concurrently perform I/O operations on the file.

Figure 5:
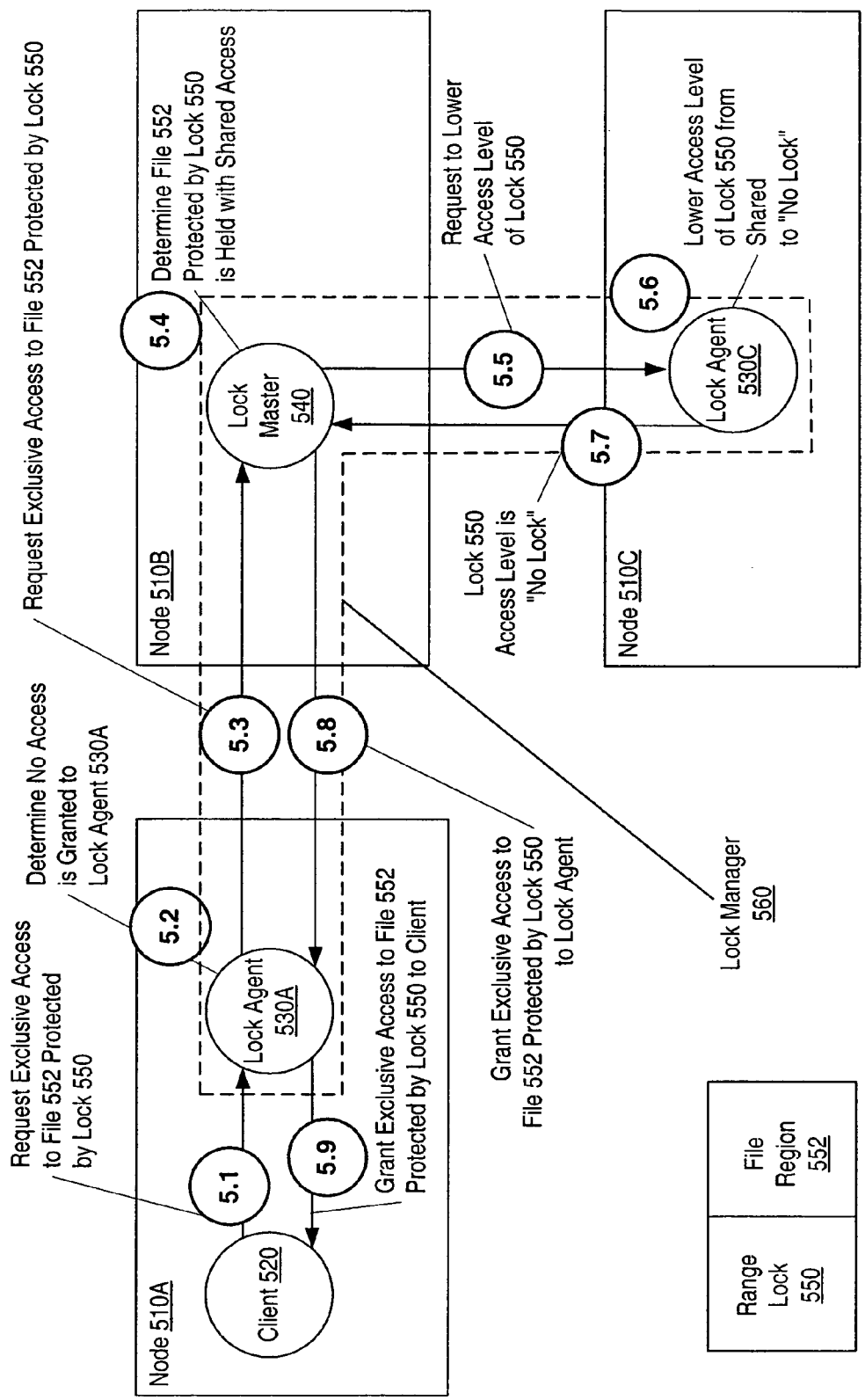
FIG. 5 shows an example implementation of locking that can be used with one embodiment of the invention.

FIG. 5 shows an example implementation of locking that can be used with one embodiment of the invention. Two nodes, node 510A and node 510B, share file range 552 protected by a range lock 550. In this example, only one range lock is shown, although one of skill in the art will recognize that ordinarily multiple range locks will be used for a number of ranges in a given file. Range lock 550 is managed by lock manager 560, which includes a module on each of nodes 510A, 510B, and 510C (lock agents 530A and 530C and lock master 540). In many environments, a single lock master exists for each lock, and the lock master resides on one of the nodes. In the example shown, lock master 540 resides on node 510B. Lock master 540 tracks the access levels for a given lock in use on all nodes. Lock master 540 also maintains a queue of unsatisfied locking requests, which lock master 540 grants as threads unlock the corresponding lock. Different locks may have lock masters on different nodes, and all nodes agree on which node masters a given lock.

Each node can have a program that handles access to data protected by each lock. In this example, lock agent 530A, a module of lock manager 560, runs on node 510A to provide access to file range 552 protected by range lock 550. Node 510C includes another lock agent 530C to handle locks for clients on node 510C. If lock agent 530A itself does not have the access level requested by a client, such as client 520, running on node 510A, lock agent 530A calls lock master 540 to request the desired access level for node 510A. Lock master 540 keeps track of the access levels, also referred to as lock levels, held by all of the lock agents on each node.

Initialization of a lock, such as range lock 550, is initiated by a client, or thread, such as client 520 of node 510A. A client calls a lock agent, such as lock agent 530A, for the lock protecting the data of interest, such as range lock 550. In the embodiment shown in FIG. 5, initialization is performed before the client is ready to use the data and allows a lock agent to prepare for that client's use of the lock. For example, the lock agent may allocate data structures or perform other functions to prepare for the client's use of the lock.

In action 5.1, client 520 requests exclusive access to file range 552 protected by range lock 550. In action 5.2, lock agent 530A determines that exclusive access to file range 552 protected by range lock 550 has not yet been granted to lock agent 530A. In action 5.3, lock agent 530A requests exclusive access to file range 552 protected by range lock 550 from lock master 540 running on node 510B.

Lock master 540 determines in action 5.4 that data protected by range lock 550 are currently held at a shared access level by lock agent 530C running on node 510C. Because file range 552 protected by range lock 550 is currently held at a shared access level, exclusive access cannot be granted to lock agent 530A. Lock master 540 has three options at this point: (1) wait until the client of lock agent 530C holding range lock 550 releases range lock 550; (2) grant shared access rather than exclusive access to lock agent 530A; or (3) request lock agent 530C to release range lock 550.

In this example, lock master 540 takes the third option, and in action 5.5, lock master 540 requests lock agent 530C to lower the access level with which lock agent 530C holds file range 552 protected by range lock 550. Lowering the access level with which a lock agent holds data protected by a lock is also referred to herein as "lowering the access level for the lock," and locks can be referred to as having an access level. Lowering the access level is also referred to herein as "releasing the access level" or releasing the lock. A request to lower the access level can also be referred to as a revocation request.

In response to the revocation request to lower the lock access level for range lock 550, in action 5.6, lock agent 530C waits on clients on node 510C to finish using file range 552 so that it can lower the access level of range lock 550. In action 5.7, lock agent 530C sends a message indicating that the access level of range lock 550 is lowered to a "no lock" access level. Lock master 540 records the fact that lock agent 530C no longer holds range lock 550. No contention exists, which allows exclusive access to be available to lock agent 530A.

In action 5.8, lock master 540 grants exclusive access to file range 552 protected by range lock 550 to lock agent 530A. Now that lock agent 530A has exclusive access to file range 552, lock agent 530A can grant exclusive access to file range 552 protected by range lock 550 to client 520, as shown in action 5.9.

In one embodiment of the invention, several types of locks are used to implement range locking. Range locks are used to effectively flush and invalidate only those pages that are accessed on another node. Extending the size of the file by one node is supported while other nodes perform I/O operations by using a special lock to change a file's size. The other nodes may be operating based upon a file size that is stale, but I/O operations are performed correctly. If an operation affects only file portions that are within the (stale) size prior to the extension, the operation can be performed correctly with no special locking required. If the operation affects file portions outside the stale size, then the operation may be blocked until the node performing the operation obtains the correct extended size of the file.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method of providing concurrent access to data, said method comprising:
   receiving, by a processor of a second network node, a request from a first network node for access to a first portion of a file, wherein
      said first portion of said file is a subset of a region of said file,
      the second network node has been granted access to said region of said file, and
      said access to said region of said file is controlled by a first range lock;
   in response to receiving the request from the first network node for access to the first portion of said file,
      said processor performing an operation on a set of pages in a page cache stored in a page cache memory coupled to said processor, wherein
         the set of pages corresponds to said region of said file,
         a first page of the set of pages corresponds to the first portion of the file, and
         the performing the operation comprises causing the first page of the set of pages to be provided to the first network node if the second network node has been granted exclusive access to the first portion of the file, and
      revoking said first range lock to the first portion if the second network node has been granted exclusive access to the first portion of the file; and
   transmitting to said second network node information causing a second range lock to be associated with said first portion of the file.

2. The method of claim 1 wherein
   a second page of the set of pages in the page cache corresponds to a second portion of the region of the file, and
   the operation is not performed on the second page.

3. The method of claim 1 wherein
   if the second network node has been granted exclusive access to the first portion, the performing the operation further comprises causing the first page of the set of pages to be flushed from the page cache to the file.

4. The method of claim 3 further comprising:
   causing the first network node to read the first portion from the file.

5. The method of claim 3 further comprising:
   causing the first portion to be provided to the first network node.

6. The method of claim 1 further comprising:
   if the second network node has been granted shared access to the first portion, the performing the operation comprises causing the first page of the set of pages to be invalidated in the page cache.

7. The method of claim 6 further comprising:
   causing the first network node to read the first portion from the file.

8. The method of claim 1 further comprising:
   if the operation changes a size of the file, blocking the operation until file size information is obtained.

9. A system for providing concurrent access to data, said system comprising:
   a processor of a second network node;
   means for causing said processor of said second network node to receive a request from a first network node for access to a first portion of a file, wherein
      said first portion of said file is a subset of a region of said file,
      said second network node has been granted access to said region of the file, and
      said access to said region of said file is controlled by a first range lock;
   means for operating on a set of pages in a page cache coupled to said processor of said second network node in response to the request from the first network node, wherein
      the set of pages corresponds to the region of the file,
      a first page of the set of pages corresponds to the first portion of the file, and
      the means for operating causes the first page of the set of pages to be provided to the first network node if the second network node has been granted exclusive access to the first portion of the file;
   means for revoking said first range lock to the first portion if the second network node has been granted exclusive access to the first portion of the file; and
   means for transmitting to said second network node information causing a second range lock to be associated with the first portion of the file.

10. The system of claim 9 wherein
    a second page of the set of pages in the page cache corresponds to a second portion of the region of the file, and
    the means for operating does not cause the second page to be provided to the first network node.

11. The system of claim 9 further comprising:
second causing means for causing said processor to flush the first page the set of pages from the page cache to the file if the second network node has exclusive access to the first portion.

12. The system of claim 11 further comprising:
third causing means for causing the first network node to read the first portion from the file.

13. The system of claim 11 further comprising:
third causing means for causing the first portion to be provided to the first network node.

14. A computer-readable storage medium comprising:
receiving instructions to cause a processor of a second network node to receive a request from a first network node for access to a first portion of a file by said first network node, wherein
 said first portion of the file is a subset of a region of the file,
 said second network node has been granted access to the region of the file, and
 said access to said region of the file is controlled by a first range lock;
causing instructions to cause an operation to be performed by said processor of said second network node on a set of pages in a page cache coupled to said processor of said second network node, wherein
 the causing instructions are performed in response to the request for access to the first portion of the file by said first network node,
 the set of pages corresponds to the region of the file,
 a first page of the set of pages corresponds to the first portion of the file, and
 the operation comprises causing the first page of the set of pages to be provided to the first network node if the second network node has been granted exclusive access to the first portion of the file;
revoking instructions for revoking said range lock to the first portion if said second network node has been granted exclusive access to said second portion; and
transmitting instructions for transmitting to said second network node information causing a second range lock to be associated with said first portion of said file.

15. The computer-readable storage medium of claim 14 wherein
a second page of the set of pages in the page cache corresponds to a second portion of the region of the file, and
the operation is not performed on the second page.

16. The computer-readable storage medium of claim 14 further comprising:
second causing instructions to cause the first page of the set of pages to be flushed from the page cache to the file if the second network node has been granted exclusive access to the first portion.

17. The computer-readable storage medium of claim 16 further comprising:
third causing instructions to cause the first network node to read the first portion from the file.

18. The computer-readable storage medium of claim 16 further comprising:
third causing instructions to cause the first portion to be provided to the first network node.

19. A system for providing concurrent access to data, said system comprising:
a processor of a second network node;
a receiving module to cause said processor of said second network node to receive a request from a first network node for access to a first portion of a file, wherein
 said first portion of said file is a subset of a region of said file,
 said second network node has been granted access to the region of the file, and
 said access to said region of said file is controlled by a first range lock;
a causing module for operating on a set of pages in a page cache coupled to said processor of the second network node, wherein
 the causing module causes the operation to be performed in response to the request for access to a first portion of the file by the first network node, wherein
 the set of pages corresponds to the region of the file,
 a first page of the set of pages corresponds to the first portion of the file, and
 the operation comprises causing the first page of the set of pages to be provided to the first network node if the second network node has been granted exclusive access to the first portion of the file;
a revoking module for revoking said range lock to the first portion if said second network node has been granted exclusive access to said first portion; and
a transmitting module for transmitting to said second network node information causing a second range lock to be associated with said first portion of said file.

20. The system of claim 19 wherein
a second page of the set of pages in the page cache corresponds to a second portion of the region of the file, and
the operation is not performed on the second page.

21. The system of claim 19 further comprising:
a second causing module to cause the processor to flush the first page of the set of pages from the page cache to the file if the second network node has been granted exclusive access to the first portion.

22. The system of claim 21 further comprising:
a third causing module to cause the first network node to read the first portion from the file.

23. The system of claim 21 further comprising:
a third causing module to cause the first portion to be provided to the first network node.

* * * * *